United States Patent
Cecchin et al.

(12) 
(10) Patent No.: US 6,306,996 B1
(45) Date of Patent: Oct. 23, 2001

(54) POLYBUTENE-1 (CO)POLYMERS AND PROCESS FOR THEIR PREPARATION

(75) Inventors: Giuliano Cecchin; Gianni Collina; Massimo Covezzi, all of Ferrara (IT)

(73) Assignee: Basell Technology Company B.V., Hoofddorp (NL)

( * ) Notice: Subject to any disclaimer, the term of this patent is extended or adjusted under 35 U.S.C. 154(b) by 0 days.

(21) Appl. No.: 09/262,777

(22) Filed: Mar. 4, 1999

(30) Foreign Application Priority Data

Mar. 5, 1998 (EP) .................................................. 98200674

(51) Int. Cl.$^7$ .............................. C08F 10/08; C08F 4/649
(52) U.S. Cl. .................... 526/348.6; 526/65; 526/124.9; 526/125.3; 526/348.3; 526/348.4; 526/348.5; 526/901; 526/902; 526/904
(58) Field of Search .................................. 526/65, 125.3, 526/348.6, 904, 901, 902, 124.9, 348.3, 348.4, 348.5

(56) References Cited

U.S. PATENT DOCUMENTS

| | | |
|---|---|---|
| 4,220,554 | 9/1980 | Scatá et al. . |
| 4,298,718 | 11/1981 | Mayr et al. . |
| 4,399,054 | 8/1983 | Ferraris et al. . |
| 4,469,648 | 9/1984 | Ferraris et al. . |
| 4,495,338 | 1/1985 | Mayr et al. . |
| 4,600,762 * | 7/1986 | Fukui et al. ................... 526/348.6 X |
| 4,724,255 * | 2/1988 | Lofgren et al. ............... 526/125.3 X |
| 5,241,024 * | 8/1993 | Yamawaki et al. ............ 526/125.3 X |

FOREIGN PATENT DOCUMENTS

| | | |
|---|---|---|
| A1 0 172 961 | 3/1986 | (EP) . |
| A2 395 083 | 10/1990 | (EP) . |
| 0 476 660 A2 | 9/1991 | (EP) . |
| A1 0 553 805 | 8/1993 | (EP) . |
| A1 0 553 806 | 8/1993 | (EP) . |
| A1 0 601 525 | 6/1994 | (EP) . |
| WO 98/44001 | 10/1998 | (WO) . |

OTHER PUBLICATIONS

Asakura, et al. "Carbon–13 NMR Spectral Assignment of Five Polyolefins Determined from the Chemical Shift Calculation and the Polymerization Mechanism", Macromolecules, vol. 24, pp. 2334–2340, (1991).

* cited by examiner

Primary Examiner—Fred Teskin
(74) Attorney, Agent, or Firm—Bryan Cave LLP

(57) ABSTRACT

The present invention relates to polybutene-1 homopolymers, or copolymers containing up to 20% by weight of alpha olefins having from 2 to 10 carbon atoms other than butene-1, characterized by the following properties:

(i) an isotactic index (mmmm %), measured by NMR analysis according to the method specified below, of higher than 93;

(ii) a Molecular Weight Distribution (MWD) in terms of Mw/Mn, measured by GPC analysis according to the method specified below, of higher than 6; and (iii) a content of catalytic residues expressed in terms of Ti ppm of lower than 50.

Said polymers are very suitable for the preparation of articles, in particular pipes, having improved creep and burst stress resistance.

27 Claims, No Drawings

POLYBUTENE-1 (CO)POLYMERS AND PROCESS FOR THEIR PREPARATION

The present invention relates to polybutene-1 (co) polymers and to a process for their preparation. The invention further relates to the articles obtained from the polybutene-1 (co)polymers of the invention. In particular the present invention relates to polybutene-1 (co)polymers characterized by high cristallinity and broad molecular weight distribution. Polybutene-1 (co)polymers are well known in the art. In view of their good properties in terms of pressure resistance, creep resistance, and impact strength they are mainly used in the manufacture of pipes to be used in the metal pipe replacement. Despite their good properties, the performances of polybutene-1 articles, and in particular pipes, sometimes resulted to be not completely satisfactory in terms of general mechanical performances and of pressure resistance in particular. Therefore, it would be desirable to improve the properties of said polybutene-1 (co)polymers, and in particular the mechanical properties, so as to have articles (in particular pipes) in which the pressure resistance (also called Burst Stress Resistance) is highly improved. The polybutene-1 (co)polymers are generally prepared by polymerizing butene-1 in the presence of $TiCl_3$ based catalysts components together with diethylaluminum chloride (DEAC) as cocatalyst. In some cases diethyl aluminum iodide (DEAI) is also used in mixtures with DEAC. The polymers obtained, however, generally do not show satisfactory mechanical properties. Furthermore, in view of the low yields obtainable with the $TiCl_3$ based catalysts, the polybutenes prepared with these catalysts have a high content of catalyst residues (generally more than 300 ppm of Ti) which lowers the properties of the polymers making it necessary a deashing step.

Polybutene-1 (co)polymers can also be obtained by polymerizing the monomers in the presence of a stereospecific catalyst comprising (A) a solid component comprising a Ti compound and an electron-donor compound supported on $MgCl_2$; (B) an alkylaluminum compound and, optionally, (C) an external electron-donor compound.

A process of this type is disclosed in EP-A-17296. This process allows the preparation of polybutene-1 polymers having an intrinsic viscosity [η] of from 1.5 to 4, as measured in decalin at 135° C., an isotacticity value of at least 95% and a Molecular Weight Distribution (MWD), expressed in terms of Mw/Mn, of not more than 6. However, the mechanical properties shown by the polymers disclosed in said application are not completely satisfactory.

Accordingly, there is still a need of polybutene-1 copolymers having excellent mechanical properties and being capable of giving pipes with high burst stress resistance. It has now surprisingly been found that polybutene-1 (co)polymers characterized by very high cristallinity and broad molecular weight distribution meet the above requirements.

It is therefore an object of the present invention to provide polybutene-1 homopolymers, or copolymers containing up to 20% by weight of α-olefins having from 2 to 10 carbon atoms other than butene- 1, characterized by the following properties:

(i) an isotactic index (mmmm %), measured by NMR analysis according to the method specified below, of higher than 93;

(ii) a Molecular Weight Distribution (MWD) in terms of Mw/Mn, measured by GPC analysis according to the method specified below, of higher than 6; and (iii) a content of catalytic residues expressed in terms of Ti ppm of lower than 50.

Preferably, the (co)polymers of the present invention have an isotactic index higher than 94 and more preferably higher than 95. Moreover, polybutene-1 (co)polymers having a MWD higher than 7 and more preferably higher than 9 are highly preferred since it has been observed that the (co) polymers coupling very high cristallinity and very broad MWD have better mechanical properties. As explained above, also copolymers of butene-1 containing up to 20% by weight of α-olefins, provided that they fulfill the above conditions, are within the scope of the present invention. Among the α-olefins different from butene particularly preferred are those selected from the group consisting of ethylene, propylene and hexene-1. The copolymers of the present invention preferably contain from 2 to 15% by weight of such olefins and more preferably from 5 to 10% by weight.

While there is no particular limitation as to the molecular weight of the polymers, it is preferred that the (co)polymers have a Mw such that the Melt Index "E" is comprised in the range of from 100 to 0.01, more preferably from 10 to 0.1. In particular, when the polymers are used in the extrusion devices for the manufacture of pipes, polymers having a Melt Index in the range of from 1 to 0.1 and particularly from 0.3 to 0.5 are preferred.

The polymers of the present invention can be prepared by polymerization of the monomers in the presence of a stereospecific catalyst comprising (A) a solid component comprising a Ti compound and an internal electron-donor compound supported on $MgCl_2$; (B) an alkylaluminum compound and, optionally, (C) an external electron-donor compound.

Magnesium dichloride in active form is preferably used as a support. It is widely known from the patent literature that magnesium dichloride in active form is particularly suited as a support for Ziegler-Natta catalysts. In particular, U.S. Pat. No. 4,298,718 and U.S. Pat. No. 4,495,338 were the first to describe the use of these compounds in Ziegler-Natta catalysis. It is known from these patents that the magnesium dihalides in active form used as support or co-support in components of catalysts for the polymerization of olefins are characterized by X-ray spectra in which the most intense diffraction line that appears in the spectrum of the non-active halide is diminished in intensity and is replaced by a halo whose maximum intensity is displaced towards lower angles relative to that of the more intense line.

The preferred titanium compounds used in the catalyst component of the present invention are $TiCl_4$ and $TiCl_3$; furthermore, also Ti-haloalcoholates of formula $Ti(OR)_{n-y}X_y$, where n is the valence of titanium and y is a number between 1 and n, can be used.

The internal electron-donor compound may be selected from esters, ethers, amines and ketones. It is preferably selected from alkyl, cycloalkyl or aryl esters of monocarboxylic acids, for example benzoic acid, or polycarboxylic acids, for example phthalic or malonic acid, the said alkyl, cycloalkyl or aryl groups having from 1 to 18 carbon atoms. Examples of the said electron-donor compounds are methyl benzoate, ethyl benzoate and diisobutyl phthalate.

The preparation of the solid catalyst component can be carried out according to several methods.

According to one of these methods, the magnesium dichloride in an anhydrous state and the internal electron donor compound are milled together under conditions in which activation of the magnesium dichloride occurs. The so obtained product can be treated one or more times with an excess of $TiCl_4$ at a temperature between 80 and 135° C. This treatment is followed by washings with hydrocarbon solvents until chloride ions disappeared. According to a further method, the product obtained by co-milling the magnesium chloride in an anhydrous state, the titanium compound and the internal electron donor compound is treated with halogenated hydrocarbons such as 1,2-dichloroethane, chlorobenzene, dichloromethane etc. The treatment is carried out for a time between 1 and 4 hours and at temperature of from 40° C. to the boiling point of the halogenated hydrocarbon. The product obtained is then generally washed with inert hydrocarbon solvents such as hexane.

According to another method, magnesium dichloride is preactivated according to well known methods and then treated with an excess of TiCl$_4$ at a temperature of about 80 to 135° C. which contains, in solution, an internal electron donor compound. The treatment with TiCl$_4$ is repeated and the solid is washed with hexane in order to eliminate any non-reacted TiCl$_4$.

A further method comprises the reaction between magnesium alcoholates or chloroalcoholates (in particular chloroalcoholates prepared according to U.S. Pat. No. 4,220,554) and an excess of TiCl$_4$ comprising the internal electron donor compound in solution at a temperature of about 80 to 120° C.

According to a preferred method, the solid catalyst component can be prepared by reacting a titanium compound of formula Ti(OR)$_{n-y}$X$_y$, where n is the valence of titanium and y is a number between 1 and n, preferably TiCl$_4$, with a magnesium chloride deriving from an adduct of formula MgCl$_2$.pROH, where p is a number between 0,1 and 6, preferably from 2 to 3.5, and R is a hydrocarbon radical having 1–18 carbon atoms. The adduct can be suitably prepared in spherical form by mixing alcohol and magnesium chloride in the presence of an inert hydrocarbon immiscible with the adduct, operating under stirring conditions at the melting temperature of the adduct (100–130° C.). Then, the emulsion is quickly quenched, thereby causing the solidification of the adduct in form of spherical particles. Examples of spherical adducts prepared according to this procedure are described in U.S. Pat. No. 4,399,054 and U.S. Pat. No. 4,469,648. The so obtained adduct can be directly reacted with the Ti compound or it can be previously subjected to thermal controlled dealcoholation (80–130° C.) so as to obtain an adduct in which the number of moles of alcohol is generally lower than 3 preferably between 0,1 and 2,5. The reaction with the Ti compound can be carried out by suspending the adduct (dealcoholated or as such) in cold TiCl$_4$ (generally 0° C.); the mixture is heated up to 80–130° C. and kept at this temperature for 0,5–2 hours. The treatment with TiCl$_4$ can be carried out one or more times. The internal electron donor compound can be added during the treatment with TiCl$_4$. The treatment with the electron donor compound can be repeated one or more times.

The preparation of catalyst components in spherical form is described for example in European Patent Applications EP-A-395083, EP-A-553805, EP-A-553806, EPA-601525 and The solid catalyst components obtained according to the above method show a surface area (by B.E.T. method) generally between 20 and 500 m$^2$/g and preferably between 50 and 400 m$^2$/g, and a total porosity (by B.E.T. method) higher than 0,2 cm$^3$/g preferably between 0,2 and 0,6 cm$^3$/g. The porosity (Hg method) due to pores with radius up to 10.000 Å generally ranges from 0.3 to 1.5 cm$^3$/g, preferably from 0.45 to 1 cm$^3$/g.

A further method to prepare the solid catalyst component of the invention comprises halogenating magnesium dihydrocarbyloxide compounds, such as magnesium dialkoxide or diaryloxide, with solution of TiCl$_4$ in aromatic hydrocarbon (such as toluene, xylene etc.) at temperatures between 80 and 130° C. The treatment with TiCl$_4$ in aromatic hydrocarbon solution can be repeated one or more times, and the internal electron donor compound is added during one or more of these treatments.

Generally, the internal electron donor compound is used in molar ratio with respect to the MgCl$_2$ of from 0.01 to 1 preferably from 0.05 to 0.5.

The alkyl-Al compound (B) is preferably chosen among the trialkyl aluminum compounds such as for example triethylaluminum, triisobutylaluminum, tri-n-butylaluminum, tri-n-hexylaluminum, tri-n-octylaluminum. It is also possible to use mixtures of trialkylaluminum's with alkylaluminum halides, alkylaluminum hydrides or alkylaluminum sesquichlorides such as AlEt$_2$Cl and Al$_2$Et$_3$Cl$_3$.

The external donor (C) can be of the same type or it can be different from the internal donor described above. Suitable external electron donor compounds include silicon compounds, ethers, esters, amines, heterocyclic compounds and particularly 2,2,6,6-tetramethyl piperidine, ketones and the 1,3-diethers of the general formula (I):

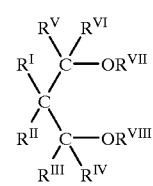

(I)

wherein R$^I$, R$^{II}$, R$^{III}$, R$^{IV}$, R$^V$ and R$^{VI}$ equal or different to each other, are hydrogen or hydrocarbon radicals having from 1 to 18 carbon atoms, and R$^{VII}$ and R$^{VIII}$, equal or different from each other, have the same meaning of R$^I$–R$^{VI}$ except that they cannot be hydrogen; one or more of the R$^I$–R$^{VIII}$ groups can be linked to form a cycle. Particularly preferred are the 1,3-diethers in which R$^{VII}$ and R$^{VIII}$ are selected from C$^1$–C$_4$ alkyl radicals.

Another class of preferred external donor compounds is that of silicon compounds of formula R$_a^5$R$_b^6$Si(OR$^7$)$_c$, where a and b are integer from 0 to 2, c is an integer from 1 to 3 and the sum (a+b+c) is 4; R$^5$, R$^6$, and R$^7$, are alkyl, cycloalkyl or aryl radicals with 1–18 carbon atoms optionally containing heteroatoms. Particularly preferred are the silicon compounds in which a is 1, b is 1, c is 2, at least one of R$^5$ and R$^6$ is selected from branched alkyl, cycloalkyl or aryl groups with 3–10 carbon atoms optionally containing heteroatoms and R$^7$ is a C$_1$–C$_{10}$ alkyl group, in particular methyl. Examples of such preferred silicon compounds are methylcyclohexyldimethoxysilane, diphenyldimethoxysilane, methyl-t-butyidimethoxysilane, dicyclopentyldimethoxysilane, diisopropyldimethoxysilane, 2-ethylpiperidinyl-2-t-butyldimethoxysilane and 1,1,1-trifluoropropyl-2-ethylpiperidinyl-dimethoxysilane. Moreover, are also preferred the silicon compounds in which a is 0, c is 3, R$^6$ is a branched alkyl or cycloalkyl group, optionally containing heteroatoms, and R$^7$ is methyl. Examples of such preferred silicon compounds are cyclohexyltrimethoxysilane, t-butyltrimethoxysilane and thexyltrimethoxysilane. The use of diisopropyldimethoxysilane is particularly preferred.

The electron donor compound (c) is used in such an amount to give a molar ratio between the organoaluminum compound and said electron donor compound (c) of from 0.1 to 500, preferably from 1 to 300 and more preferably from 3 to 100.

The polymerization process can be carried out according to known techniques, for example slurry polymerization using as diluent an inert hydrocarbon solvent, or solution polymerization using for example the liquid butene-1 as a reaction medium. Moreover, it is also possible to carry out the polymerization process in the gas-phase, operating in one or more fluidized or mechanically agitated bed reactors. Solution and gas-phase processes are highly preferred.

The polymerization is generally carried out at temperature of from 20 to 120° C., preferably of from 40 to 80° C. When the polymerization is carried out in the gas-phase the operating pressure is generally between 0.1 and 2.5 MPa, preferably between 0.5 and 1.5 MPa. In the bulk polymerization the operating pressure is generally between 1 and 6 MPa preferably between 1.5 and 4 MPa. Furthermore, in order to make the catalyst particularly suitable for the polymerization step, it is possible to prepolymerize said catalyst in a prepolymerization step. Said prepolymerization can be carried out in liquid, (slurry or solution) or in the gas-phase, at temperatures generally lower than 100° C., preferably between 20 and 70° C. The prepolymerization step is carried out with small quantities of monomers for the time which is necessary to obtain the polymer in amounts of between 0.5 and 2000 g per g of solid catalyst component, preferably between 5 and 500 and, more preferably, between 10 and 100 g per g of solid catalyst component. The monomer used in the prepolymerization can be butene-1 and/or another α-olefin having from 2 to 10 carbon atoms. In particular, very good results are obtained when the prepolymerization is carried out with propylene. In this case it has been found particularly useful to carry out the prepolymerization with monomer amounts and polymerization times necessary to obtain a polypropylene content of from 0.5 to 20%, preferably from 1 to 15% based on the weight of the final polybutene-1 product. The polybutene-1 composition obtained by this in-reactor-blend process showed excellent properties, in particular a very high burst stress resistance.

As previously explained, the polybutenes of the invention is characterized by a broad Molecular Weight Distribution in particular of higher than 6 when expressed in terms of Mw/Mn. Polybutene-1 with such a broad MWD can be obtained in several ways. One of the methods consists in using, when (co)polymerizing butene-1, a catalyst intrinsically capable of producing broad MWD polymers. Another possible method is that of mechanically blending butene-1 polymers having different enough molecular weights using the conventional mixing apparatus.

One of the preferred methods for preparing the polybutenes of the invention comprises a gas-phase or solution process carried out in at least two polymerization reactors operating under different working conditions such as concentration of molecular weight regulator, monomer concentration, temperature, pressure etc. This particular process allows to obtain polybutenes of different average Molecular Weight in the two reactors thus leading to a final product having a broad MWD optionally of bimodal type. With the respect to the use of a broad MWD catalyst this method has the advantage that the various polymerization step can be properly modulated so as to both produce a final product having the desired breath of MWD and properly tailoring the other properties like melt index, etc.

Furthermore, in comparison with a process of mechanically blending polymers having different molecular weight, the multistep polymerization process has the advantage of producing polymers having good homogeneity notwithstanding the large difference in the molecular parameters of the two polymer fractions. Without wanting to be bound to any theory a possible explanation to this fact is that since the two polymers grew in the same reaction medium a better degree of mixing is achieved with respect to the mechanical blending technique.). This feature is very important because it is directly correlated to the number and kind of gels of the polymer that, in turn, gives rise to the undesired presence of fish-eyes in the polyolefin products. This problem is particularly relevant in broad molecular weight distribution polymer where there are fractions of very different molecular weight. Accordingly, polymers having high homogeneity would show a reduced content of gels and therefore better mechanical and appearance properties. The polybutene-1 polymers of the present invention, are characterized by a very high homogeneity has evidenced by a number of gels lower than 400 per $m^2$ of film, preferably lower than 300 and still more preferably lower than 200. It has been observed that this type of product shows mechanical properties of high interest. It has also been observed that the presence of the additional prepolymerization step further improves the quality of the final products.

The polybutenes of the invention can be used as such in all the applications for which polybutenes are generally employed. However, as it is known to the experts in this field, and as it can be easily determined by routine tests, it is possible to add further polymer components, additives (such as stabilizers, antioxidants, anticorrosives, nucleating agents, processing aids, etc.) and both organic and inorganic fillers which can give specific properties to the products of the invention.

The following examples are given in order to better illustrate the invention without limiting it.

Characterization

Determination of Isotactic Index (mmmm %). by $^3$C NMR

The measurement is carried out by preparing a 10% wt solution of the polymer in $C_2Cl_4D_2$ and recording the spectra at a temperature of 120° C. with a DRX 500 MHz instrument operating at 125,7 MHz under proton Waltzl6 decoupling in FT mode, with 10 Khz spectral width, 90° pulse angle and 16sec. puls repetition and 3600 scans. The Isotactic index is then calculated according to: *Carbon*-13 *NMR Spectral Assignment of Five Polyolefins Determined from the Chemical Shift Calculation and the Polymerization Mechanism*, T. Asakura and others, *Macromolecules* 1991, 24 2334–2340.

Determination of Melt Index

ASTM D 1238 condition "E"

MWD Determination by Gel Permeation Chromatography (GPC)

This is determined using a Waters 150-C ALC/GPC system equipped with a TSK column set (type GMHXL-HT) working at 135° C. with 1,2-dichlorobenzene as solvent (ODCB) (stabilized with 0.1 vol. of 2,6-di-t-butyl p-cresole (BHT)) at flow rate of 1 ml/min. The sample is dissolved in ODCB by stirring continuously at a temperature of 140° C. for 1 hour. The solution is filtered through a 0.45μm Teflon membrane. The filtrate (concentration 0.08–1.2g/l injection volume 300 μl) is subjected to GPC. Monodisperse fractions of polystyrene (provided by Polymer Laboratories) were used as standard. The universal calibration for PB copolymers was performed by using a linear combination of the Mark-Houwink constants for PS (K=7.11×10$^{-5}$dl/g; α=0.743) and PB (K=1.18×10$^{-4}$dl/g; α=0.725)

Creep Resistance (% Deformation)

It was evaluated by measuring the % deformation of a specimen kept for 10000 minutes under a load of 10Mpa and at a temperature of 50° C.

Burst Stress Resistance

Determination is carried out according to ISO 1167: 1996
Comonomer content: Percentage by weight of comonomer determined by NMR spectroscopy.
Intrinsic viscosity [η]: ASTM 2857-70.
Catalyst Residues (ppm Ti)

The ppm of titanium in the polymer are determined by x-ray fluorescence spectrometry using a Phillips PW 1404 instrument.
Determination of the Number of gels (fish-eyes) per m$^2$ The determination of the number of gels per m$^2$ is carried out by visually detecting the number of gels of a piece of polybutene film (50μ thickness, 130×7.5 cm size) which is projected by a projector, on the wall-chart with a magnificated scale. The counting is made on 5 different pieces of the same film and a final number is given by the expression No=A/S where No is the number of gels per m$^2$, A is the number of gels counted on 5 film pieces and S is the overall surface in m$^2$ of the 5 films pieces examined.

Strength at Yield: ASTM D 638

Strength at Break: ASTM D 638

Elongation at Yield: ASTM D 638

Elongation at Break: ASTM D 638

Flexural Modulus: ASTM D 790

Tensile Modulus: ASTM D 790

Izod: ASTM D256

EXAMPLES

Example 1

Preparation of Solid Catalyst Component

Into a 500 ml four-necked round flask, purged with nitrogen, 225 ml of TiCl$_4$ were introduced at 0° C. While stirring, 10.3 g of microspheroidal MgCl$_2$.2.1C$_2$H$_5$OH (obtained by partial thermal dealcoholation of an adduct prepared as described in Ex. 2 of U.S. Pat. No. 4,399,054 but operating at 3,000 rpm instead of 10,000) were added. The flask was heated to 40° C. and 6,5 mmoles of diisobutylphthalate were thereupon added. The temperature was raised to 100° C. and maintained for two hours, then stirring was discontinued, the solid product was allowed to settle and the supernatant liquid was siphoned off.

200 ml of fresh TiCl$_4$ were added, the mixture was reacted at 120° C. for one hour and then the supernatant liquid was siphoned off. The treatment with TiCl$_4$ and didisobutylphthalate was repeated and the solid obtained was washed six times with anhydrous hexane (6×100 ml) at 60° C. and then dried under vacuum: The catalyst component contained 2.4 wt % of Ti and 8.6 wt % of phthalate.
Gas Phase Polymerization of Butene-1

The catalyst component prepared as described above, AlEt$_3$ (TEA) and diisopropyldimethoxy silane (DIPMS) in amounts such as to have a TEA/cat. weight ratio of 10, a TEA/DIPMS weight ratio of 8 and a DIPMS/Cat weight ratio of 1.25, were mixed into an activation vessel containing propane as inert medium, at room temperature and for a residence time of about 15 min.

The product of the above reaction was then fed into a prepolymerization loop reactor kept at a temperature of 35° C. containing liquid propylene. The prepolymerization lasted 2 hours during which no further catalyst was added. A conversion of 288 g/g cat. comp was obtained. The prepolymer catalyst system so obtained was then introduced into a first gas-phase polymerization reactor working under the following conditions:

Temperature (° C.): 60° C.

Polymerization time (hours): 11

Pressure (bar): 9

Butene (%mol in gas phase): 20

Propane (%mol in gas phase):80

Yield: 1,4 Kg/g cat

The so obtained product was then introduced into a second gas-phase polymerization reactor working under the following conditions:

Temperature (° C.): 70° C.

Polymerization time (hours): 9

Pressure (bar): 9

Butene (%mol in gas-phase): 20

Propane (%mol in gas-phase):80

Hydrogen (g/h): 6.7

Yield: 5Kg/g cat

A final polybutene-1 product having the following characteristics was obtained:

Isotactic Index (%mmmm) 95.1

MWD: 10,3

Mw: 740000

Mn: 71800

MIE (g/10 min): 0.48

Catalyst residue (Ti ppm): 27

Polypropylene content (%wt): 5

The polybutene obtained was subjected to measurement of the following properties. The results, which are listed in table 1, have been also compared with the performances of PB 5040G a polybutene-1 product commercialized by Mitsui and of PB0110 a polybutene-1 commercialized by Shell. The specimens were prepared according to ASTM D 2581.

Example 2

Bulk Polymerization of Butene-1

The catalyst component prepared as described above, AlIBu$_3$ (TIBA) and diisopropyldimethoxy silane (DIPMS) in amounts such as to have a TIBA/cat. weight ratio of 80, a TIBA/DIPMS weight ratio of 10, were mixed into an activation vessel containing hexane as inert medium, at room temperature and for a residence time of about 5 min.

The product of the above reaction was then fed, at room temperature, into the reactor containing liquid butene-1. Then, the temperature was raised up to 75° C. within 10 minutes and the polymerization performed in absence of hydrogen at such a Temperature in the following conditions:

Temperature (° C.): 70° C.

Polymerization time (hours): 2 hrs

Pressure (barg): 10

Then, hydrogen was fed to the reactor and the second polymerization step was performed in the following conditions:

Temperature (° C.): 75° C.

Polymerization time (hours): 2

Pressure (barg): 14

Yield achieved was: 14 Kg/g cat

A final polybutene-1 product having the following characteristics was obtained:

Isotactic Index (% mmmm) 95.4

MWD: 8

MIE (g/10min): 0,35

Catalyst residue (Ti ppm): 2

The results of the test to which the polybutene obtained was subjected are listed in table 1.

|  |  | Example 1 | Example 2 | PB0110 | PB504G |
|---|---|---|---|---|---|
| Melt Index (E) | g/10 min. | 0.48 | 0.35 | 0.37 | 0.4 |
| Strength at Yield | Mpa | 21.9 | 18.3 | 16.7 | n.d |
| Strength at Break | Mpa | 37.8 | 38 | 35 | " |
| Elongation at Yield | % | 16.5 | 18.4 | 28 | " |
| Elongation at Break | % | 400 | 320 | 380 | " |
| Flexural Modulus | Mpa | 570 | 430 | 345 | " |
| Tensile Modulus | Mpa | 550 | 480 | 370 | " |
| Izod at −20° C. | J/m | 60 | 73 | 40 | " |
| Izod at 23° C. | J/m | 430 | 400 | >500 | " |
| Creep Resistance | (%) | 5.3 | 7.4 | 9.8 | n.d. |
| 1000 Hrs Burst Stress | Mpa | 8.2 | 7.3 | 6.1 | 6.9 |
| Gels | N°/m$^2$ | <300 | <300 | n.d. | n.d. |
| Instant Burst Stress | Mpa | 10.2 | 8.4 | 6.88 | 7.88 |

What is claimed is:

1. Polybutene-1 homopolymers, or copolymers containing up to 20% by weight of alpha olefins having from 2 to 10 carbon atoms other than butene-1, characterized by the following properties:
   (i) an isotactic index (mmmm %), measured by NMR analysis according to the method specified, of higher than 94;
   (ii) a Molecular Weight Distribution (MWD) in terms of Mw/Mn, measured by GPC analysis according to the method specified, of higher than 6; and
   (iii) a content of catalytic residues expressed in terms of Ti ppm of lower than 50.

2. Polybutene-1 homo or copolymers according to claim 1 having an isotactic index higher than 95.

3. Polybutene-1 homo or copolymers according to claim 1 having a MWD higher than 7.

4. Polybutene-1 homo or copolymers according to claim 3 having a MWD higher than 9.

5. Polybutene-1 homo or copolymers according to claim 4 having an isotactic index higher than 95.

6. Polybutene-1 copolymers according to claim 1 in which the alpha olefins are selected from the group consisting of ethylene, propylene and hexene-1.

7. Polybutene-1 copolymers according to claim 6 in which the content of said olefins is from 2 to 15% by weight.

8. Polybutene-1 copolymers according to claim 7 in which the content of said olefins is from 5 to 10% by weight.

9. Polybutene-1 homo or copolymers according to claim 8 having a MIE (Melt Index, measured in accordance with ASTM D 1238, condition E) in the range of from 10 to 0.1 g/10 min.

10. Polybutene-1 homo or copolymers according to claim 9 having a MIE in the range of from 1 to 0.1 g/10 min.

11. Polybutene-1 homo or copolymers according to claim 1 containing of from 0.5 to 20% by weight of polypropylene.

12. Polybutene-1 homo or copolymers according to claim 11 containing from 1 to 10% by weight of polypropylene.

13. Polybutene-1 homo or copolymers according to claim 1 having a bimodal MWD.

14. Polybutene-1 homo or copolymers according to claim 1 having a number of gels per m$^2$ lower than 400.

15. Polybutene-1 homo or copolymers according to claim 14 having a number of gels per m$^2$ lower than 300.

16. Polybutene-1 homo or copolymers according to claim 15 having a number of gels per m$^2$ lower than 200.

17. Manufactured articles obtained from the polybutenes according to claim 1.

18. Process for the preparation of the polybutene-1 homo or copolymers according to claim 1 carried out in the presence of a stereospecific catalyst comprising (A) a solid component comprising a Ti compound and an internal electron-donor compound supported on MgCl$_2$; (B) an alkylaluminum compound and, (C) an external electron-donor compound.

19. Process according claim 18 in which external electron donor compound (C)is diisopropyldimethoxysi lane.

20. Process according claim 19 in which the internal electron donor compound is diisobutylphthalate.

21. Process according to claim 18 carried out in the gas-phase.

22. Process according to claim 18 carried out in solution.

23. Process according to claim 22 carried out in liquid monomer.

24. Process according to claim 18 characterized in that said process comprises a prepolymerization step.

25. Process according to claim 24 in which the prepolymerization step is carried out by polymerization of propylene in amounts of between 0.5 and 2000 g per g of solid catalyst component.

26. Process according to claim 18 characterized by the fact that is carried out in at least two polymerization reactors operating under different working conditions.

27. Polybutene-1 homo or copolymers according to claim 10 having a MIE in the range of from 0.3 to 0.5 g/10 min.

* * * * *